(12) United States Patent
Tian

(10) Patent No.: US 12,166,714 B2
(45) Date of Patent: Dec. 10, 2024

(54) METHOD AND APPARATUS FOR DETERMINING POSITION OCCUPIED BY RESOURCE, USER EQUIPMENT, AND STORAGE MEDIUM

(71) Applicant: GUANGDONG OPPO MOBILE TELECOMMUNICATIONS CORP., LTD., Dongguan (CN)

(72) Inventor: Wenqiang Tian, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 397 days.

(21) Appl. No.: 17/738,864

(22) Filed: May 6, 2022

(65) Prior Publication Data

US 2022/0263626 A1 Aug. 18, 2022

Related U.S. Application Data

(63) Continuation of application No. PCT/CN2019/116871, filed on Nov. 8, 2019.

(51) Int. Cl.
*H04L 5/00* (2006.01)
*H04W 74/0808* (2024.01)

(52) U.S. Cl.
CPC ........ *H04L 5/0048* (2013.01); *H04W 74/0808* (2013.01)

(58) Field of Classification Search
CPC ... H04L 5/0048; H04L 5/0023; H04L 5/0094; H04W 74/0808; H04W 56/0015; Y02D 30/70
USPC ........................................... 370/336
See application file for complete search history.

(56) References Cited

U.S. PATENT DOCUMENTS

| | | | | |
|---|---|---|---|---|
| 11,770,806 B2* | 9/2023 | Lee | ........... | H04L 5/0048 370/329 |
| 2019/0215790 A1* | 7/2019 | Kim | ........... | H04L 5/0048 |
| 2019/0215834 A1* | 7/2019 | Novlan | ........... | H04W 72/0453 |
| 2020/0413356 A1* | 12/2020 | Wang | ........... | H04W 72/046 |

(Continued)

FOREIGN PATENT DOCUMENTS

| | | | | |
|---|---|---|---|---|
| CA | 3104555 A1 * | 1/2020 | ........ | H04W 52/0212 |
| CN | 109391443 A * | 2/2019 | ........ | H04B 17/382 |
| CN | 109474939 A | 3/2019 | | |
| CN | 110249582 A | 9/2019 | | |

(Continued)

OTHER PUBLICATIONS

International Search Report issued in corresponding International Application No. PCT/CN2019/116871, mailed Jul. 15, 2020, 29 pages.

(Continued)

*Primary Examiner* — Mahendra R Patel
(74) *Attorney, Agent, or Firm* — BAYES PLLC

(57) ABSTRACT

The present disclosure provides a method and device for determining a resource occupation position, a user equipment and a storage medium, which relates to the field of communication technology. The method includes: receiving position configuration information including a configuration status of a base station regarding a candidate position for transmitting a synchronization signal block; determining valid configuration information in the position configuration information; and determining, according to the valid configuration information, the resource occupation position in all candidate positions in a transmission window of the synchronization signal block, the candidate positions being positions for transmitting the synchronization signal block.

15 Claims, 4 Drawing Sheets

(56) References Cited

U.S. PATENT DOCUMENTS

| | | | | |
|---|---|---|---|---|
| 2021/0126692 A1* | 4/2021 | Chung | ............... | H04B 7/0626 |
| 2022/0030607 A1* | 1/2022 | Liu | ..................... | H04W 72/23 |

FOREIGN PATENT DOCUMENTS

| | | | | | |
|---|---|---|---|---|---|
| CN | 109474939 B | * | 9/2021 | ........... | H04L 1/1642 |
| EP | 4344334 A2 | * | 3/2024 | .......... | H04W 56/001 |
| WO | WO-2018201403 A1 | * | 11/2018 | .......... | H04J 11/0073 |
| WO | WO-2019047228 A1 | * | 3/2019 | ............ | H04L 5/005 |
| WO | WO-2019184563 A1 | * | 10/2019 | ........... | H04J 3/0638 |
| WO | WO-2020032705 A1 | * | 2/2020 | .......... | H04B 7/0619 |
| WO | WO-2020057317 A1 | * | 3/2020 | .......... | H04L 5/0048 |
| WO | WO-2021051306 A1 | * | 3/2021 | | |

OTHER PUBLICATIONS

Written Opinion of the International Searching Authority issued in corresponding International Application No. PCT/CN2019/116871, mailed Jul. 15, 2020, 7 pages.

First Office Action issued in corresponding Chinese application No. 202211089412.8, mailed Jul. 29, 2023.
First Office Action issued in corresponding Indian application No. 202227027618, mailed Sep. 13, 2022.
Extended European Search Report issued in corresponding European application No. 19951607.1, mailed Oct. 5, 2022.
Xiaomi, "SSB transmission in NRU initial access", R1-1813363, 3GPP TSG RAN WG1 Meeting #95 Spokane, USA, Nov. 12-16, 2018.
Qualcomm Incorporated, "Feature lead summary on initial access signals and channels for NR-U", R1-1909814, 3GPP TSG RAN WG1 Meeting #98 Prague, CZ Aug. 26-30, 2019.
Notice of Allowance issued in corresponding Chinese application No. 202211089412.8, mailed Oct. 27, 2023.
Extended European Search Report issued in corresponding European application No. 23208633.0, mailed Dec. 5, 2023.
"Feature lead summary 1 of Enhancements to initial access procedure", R1-1911286, Source: Charter Communications, 3GPP TSG RAN WG1 Meeting #98BIS, Chongqing, P.R. China, Oct. 14-20, 2019.

* cited by examiner

METHOD AND APPARATUS FOR DETERMINING POSITION OCCUPIED BY RESOURCE, USER EQUIPMENT, AND STORAGE MEDIUM

CROSS-REFERENCE TO RELATED APPLICATIONS

This is a continuation of International Application No. PCT/CN2019/116871, filed on Nov. 8, 2019, the content of which is incorporated herein by reference in its entirety.

TECHNICAL FIELD

The present disclosure relates to the field of communication technology, and more particularly, to a method and device for determining a resource occupation position and a user equipment.

BACKGROUND

In the New Radio-unlicensed (NR-U) technology of the 5th generation mobile networks (5G), in each transmission period, a base station may transmit a synchronization signal block (SSB, SS/PBCH block) to a user equipment (UE) at a certain number of candidate positions. However, among the certain number of candidate positions, only some of the candidate positions may actually transmit the SSB to the UE. Therefore, it is necessary to determine the candidate positions where the base station may transmit the SSB to the UE, so that the UE can perform rate matching. However, the identified candidate positions are usually inaccurate.

SUMMARY

The present disclosure provides a method and device for determining a resource occupation position, a user equipment and a storage medium.

In a first aspect, an embodiment of the present disclosure provides a method for determining a resource occupation position, including: receiving position configuration information, wherein the position configuration information includes a configuration status of a base station regarding a candidate position for transmitting a synchronization signal block; determining valid configuration information in the position configuration information; and determining, according to the valid configuration information, the resource occupation position in all candidate positions in a transmission window of the synchronization signal block, wherein the candidate positions are positions for transmitting the synchronization signal block.

In a second aspect, an embodiment of the present disclosure provides a device for determining a resource occupation position, including: an information receiving module, configured to receive position configuration information, wherein the position configuration information includes a configuration status of a base station regarding a candidate position for transmitting a synchronization signal block; an information determining module, configured to determine valid configuration information in the position configuration information; and a position determining module, configured to determine, according to the valid configuration information, the resource occupation position in all candidate positions in a transmission window of the synchronization signal block, wherein the candidate positions are positions for transmitting the synchronization signal block.

In a third aspect, an embodiment of the present disclosure provides a user equipment, including: one or more processors; a system memory; a touch screen memory; and one or more programs, wherein the one or more programs are stored in the system memory and configured to be executed by the one or more processors, the one or more programs are configured to perform the above method.

In a fourth aspect, an embodiment of the present disclosure provides a computer-readable storage medium having a program code stored thereon, and the program code can be invoked by a processor to execute the above method.

BRIEF DESCRIPTION OF THE DRAWINGS

In order to illustrate the technical solutions in the embodiments of the present disclosure more clearly, the drawings that are used in the description of the embodiments will be described in brief Obviously, the drawings in the following description are only some embodiments of the present disclosure. For those skilled in the art, other drawings may also be obtained from these drawings without creative effort.

DETAILED DESCRIPTION

The solution in embodiments of the present disclosure will be described clearly and completely with reference to the accompanying drawings in the embodiments of the present disclosure in order to make those skilled in the art better understand the solution of the present disclosure.

Figure 1:
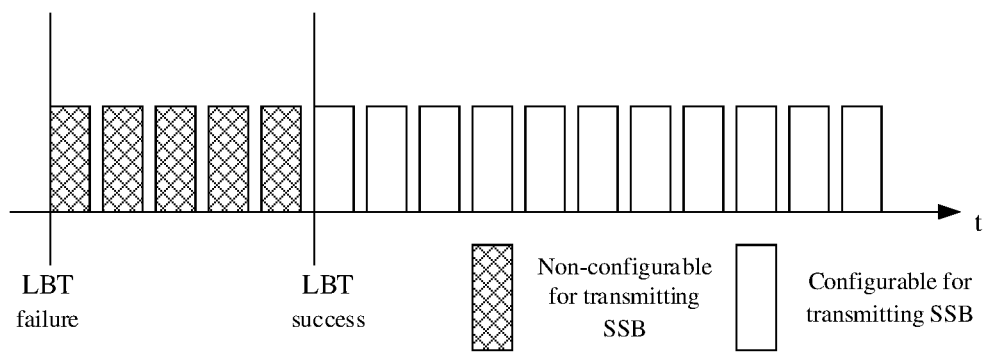
FIG. 1 shows a schematic diagram of an arrangement of candidate positions according to an embodiment of the present disclosure.

In 5G technology, an LBT (Listen Before Talk) success position of a base station on an unlicensed spectrum is unpredictable. If the LBT fails, it may cause the base station to fail to transmit an SSB, and may also cause the terminal to fail to receive the SSB. In NR-U, one SSB is transmitted at one candidate position, and one candidate position may be used to transmit one SSB or may not transmit the SSB. Therefore, a plurality of candidate positions for transmitting the SSB may be provided, and the number of candidate positions provided is larger than the maximum number of SSBs to be transmitted, so that after the LBT succeeds, there are still enough candidate positions for the base station to transmit the SSBs, and accordingly, the impact of LBT failure on the user equipment receiving SSBs may be avoided, as shown in FIG. 1.

For example, if the base station transmits a maximum of 8 SSBs in a transmission period, more than 8 candidate positions may be configured, for example, 20 candidate positions for transmitting SSBs are pre-configured, and a maximum of 8 SSBs may be transmitted on the 20 candidate positions for transmitting SSBs. As shown in FIG. 1, the candidate position is a position in a time domain.

In the configured candidate positions, some candidate positions may transmit SSBs, and some candidate positions will not transmit SSBs. If all candidate positions are regarded as candidate positions that may transmit SSBs, the user equipment cannot perform rate matching well, and it will also cause a waste of available resources. Therefore, the user equipment may determine, in the configured candidate positions, which candidate positions will not transmit SSBs, and which candidate positions may transmit SSBs, so that the UE may perform rate matching on the candidate positions that may transmit SSBs and may use the candidate positions that will not transmit SSBs to transmit other information, for example physical downlink control channel (PDCCH), physical downlink shared channel (PDSCH) or other reference signals (RSs), such as channel-state information reference signal (CSI-RS), demodulation reference signal (DMRS), tracking reference signal (TRS), phase noise tracking reference signal (PTRS).

In an embodiment of the present disclosure, the determined candidate position that may transmit SSBs is used as a resource occupation position, which indicates that the candidate position may be occupied.

The user equipment needs to use position configuration transmitted by a base station to determine the resource occupation position. However, if the position configuration information includes invalid information, it will cause the confirmation of the resource configuration position to be inaccurate.

Figure 2:
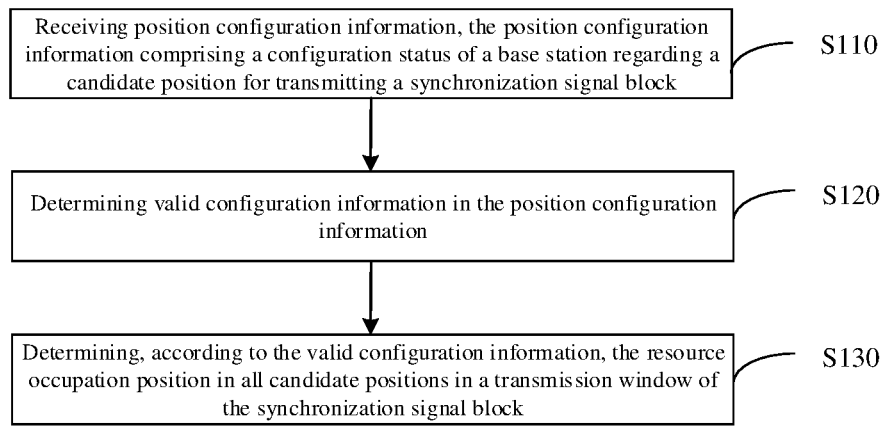
FIG. 2 shows a flowchart of a method for determining a resource occupation position according to an embodiment of the present disclosure.

Therefore, the inventor proposes a method for determining a resource occupation position according to an embodiment of the present disclosure, in which valid configuration information in received position configuration information is determined. The valid configuration information is used by the user equipment to determine, in the unlicensed frequency band, the candidate position that may transmit SSBs, and correspondingly, the position that will not transmit SSBs in all the candidate positions may be determined at the same time. The determined position that may transmit SSBs is used as the resource occupation position. Specifically, as shown in FIG. 2, the method according to an embodiment includes steps S110 to S130.

In step S110, position configuration information is received, the position configuration information including a configuration status of a base station regarding a candidate position for transmitting a synchronization signal block.

The base station may transmit the position configuration information which may be indication information (index) to the user equipment, to notify the user equipment of the configuration status of the base station regarding the candidate position for transmitting the synchronization signal block.

In step S120, valid configuration information in the position configuration information is determined.

In the position configuration information transmitted by the base station, only the valid configuration information may truly reflect the configuration status of the base station regarding the candidate position for transmitting the synchronization signal block.

After receiving the position configuration information, the user equipment may determine the valid configuration information therefrom, so as to determine the transmission status of the synchronization signal block at each candidate position according to the valid configuration information, that is, determine at which candidate positions the base station may transmit the synchronization signal block to the user equipment, and at which candidate positions the base station will not transmit the synchronization signal block to the user equipment. The terminal equipment may receive the synchronization signal block at the candidate position where the base station may transmit the synchronization signal block, and the terminal equipment will not receive the synchronization signal block at the candidate position where the base station may not transmit the synchronization signal block.

In step S130, the resource occupation position in all candidate positions in a transmission window of the synchronization signal block is determined according to the valid configuration information, the candidate positions being positions for transmitting the synchronization signal block.

The valid configuration information may include an arrangement relationship between a candidate position configurable for transmitting the synchronization signal block and a candidate position non-configurable for transmitting the synchronization signal block in a group of candidate positions. The candidate position configurable for transmitting the synchronization signal block is a candidate position that may transmit the synchronization signal block, and the candidate position non-configurable for transmitting the synchronization signal block is a candidate position that will not transmit the synchronization signal block. The respective candidate positions in the group of candidate positions are adjacent in the time domain. The candidate position that may transmit the synchronization signal block indicates that within a transmission period, if the LBT is successful and the synchronization signal block corresponding to the candidate position has not been transmitted, the base station will transmit the corresponding synchronization signal block at the candidate position.

Therefore, according to the arrangement relationship of the group of candidate positions in the valid configuration information, the candidate position, which corresponds to the candidate position configurable for transmission, in all candidate positions in the transmission window of the synchronization signal block is determined as the resource occupation position.

In an embodiment of the present disclosure, after the position configuration information is received, the valid configuration information is determined therefrom, so that the resource occupation position determined according to the valid configuration information is more accurate.

Figure 3:
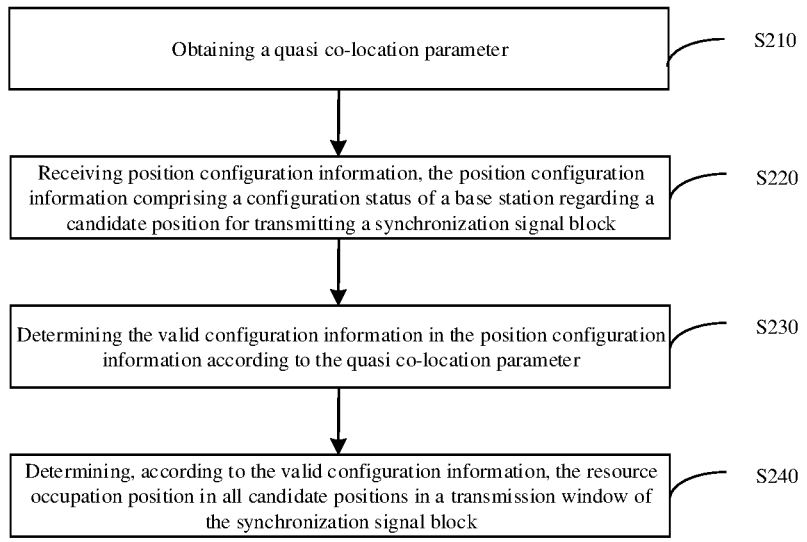
FIG. 3 shows a flowchart of a method for determining a resource occupation position according to another embodiment of the present disclosure.

The valid configuration information truly reflects the arrangement relationship between the candidate position configurable for transmitting the synchronization signal block and the candidate position non-configurable for transmitting the synchronization signal block in the group of candidate positions. According to the arrangement relationship of the group of candidate positions, the candidate position, which has a quasi co-location (QCL) relationship with the candidate position configurable for transmission, in all candidate positions in the transmission window of the synchronization signal block may be determined as the resource occupation position. Therefore, the present disclosure provides an embodiment in which the valid configuration information may be determined according to a quasi-co-location parameter. The quasi-co-location parameter is used to determine a quasi co-location relationship between the candidate positions in the transmission window. In an embodiment, as shown in FIG. 3, steps S210 to S240 are included.

In step S210, a quasi co-location parameter is obtained. The quasi co-location parameter is configured to determine a quasi co-location relationship between candidate positions in a transmission window.

In step S220, position configuration information is received. The position configuration information includes a configuration status of a base station regarding a candidate position for transmitting a synchronization signal block.

In an embodiment of the present disclosure, the user equipment may obtain the quasi co-location (QCL) parameter and the position configuration information from the base station. The order in which the quasi-co-location parameter and the position configuration information are obtained is not limited in the embodiments of the present disclosure, and is determined according to actual requirements.

In step S230, valid configuration information in the position configuration information is determined according to the quasi co-location parameter.

Specifically, the quasi co-location parameter may be a positive integer Q, and the position configuration information indicates a group of candidate positions with a number being K, where K is a positive integer. Then, when determining the valid configuration information in the position configuration information according to the quasi co-location parameter, the valid configuration information may be determined according to the magnitude relationship between Q and K.

In a first implementation, if Q is less than or equal to K, first Q candidate positions in the group of candidate positions are used as the valid configuration information.

In a second implementation, if Q is less than or equal to K, last Q candidate positions in the group of candidate positions are used as the valid configuration information.

In addition, in an embodiment of the present disclosure, the base station may use a bitmap as the position configuration information transmitted to the user equipment. Each bit in the bitmap represents a candidate position. The number of bits in the bitmap represents the number of candidate positions in the group of candidate positions, in other words, the length of the bitmap represents the number of candidate positions in the group of candidate positions in the position configuration information. In the bitmap, one of 0 or 1 may represent the candidate position configurable for transmitting the synchronization signal block, the other one of 0 or 1 may represent the candidate position non-configurable for transmitting the synchronization signal block, and the arrangement between 0 and 1 represents the arrangement relationship between the candidate position configurable for transmitting the synchronization signal block and the candidate position non-configurable for transmitting the synchronization signal block in the group of candidate positions. In an embodiment of the present disclosure, in the bitmap, 1 represents a candidate position where the synchronization signal block may actually be transmitted, and 0 represents a candidate position where the synchronization signal block will not be transmitted. Therefore, the arrangement relationship between the candidate position configurable for transmitting the synchronization signal block and the candidate position non-configurable for transmitting the synchronization signal block may be determined according to the arrangement between 1 and 0.

When the bitmap is used as the position configuration information, in the above-mentioned first implementation, first Q bits in the bitmap are used as the valid configuration information.

For example, if the position configuration information is 11010000, and the quasi-co-location parameter Q is 4, then it may be determined that the valid configuration information is 1101, which indicates that the number of valid candidate positions is 4, the first, the second, and the fourth candidate positions are the candidate positions where the synchronization signal block may be transmitted, the third candidate position is the candidate position where the synchronization signal block will not be transmitted. For another example, if the position configuration information is 11010000 and the quasi co-location parameter Q is 8, it may be determined that the valid configuration information is 11010000.

When the bitmap is used as the position configuration information, in the above-mentioned second implementation, last Q bits in the bitmap are used as the valid configuration information.

For example, if the position configuration information is 00001110 and the quasi-co-location parameter Q is 4, it may be determined that the valid configuration information is 1110, which indicates that the number of valid candidate positions is 4, the first, second and third candidate positions are the candidate positions where the synchronization signal block may be transmitted, and the fourth candidate position is the candidate position where the synchronization signal block will not be transmitted. For another example, if the position configuration information is 00001110 and the quasi co-location parameter Q is 8, it may be determined that the valid configuration information is 00001110.

In an embodiment of the present disclosure, the foregoing two implementations may be selected according to specific conditions.

For example, the first implementation or the second implementation may be selected according to whether the higher bit is given priority or the lower bit is given priority in the position configuration information.

For example, if it is determined that the lower bit is given priority, since in the position configuration information, the more behind the lower the bit is, the second implementation is selected to determine the valid configuration information; and if it is determined that the higher bit is given priority, since in the position configuration information, the more in front the higher the bit is, the first implementation is selected to determine the valid configuration information.

Optionally, whether the higher bit is given priority or the lower bit is given priority may be determined according to information transmitted by the base station, that is, the base station transmits information indicating whether the higher bit is given priority or the lower bit is given priority, and whether the higher bit is given priority or the lower bit is given priority is determined according to the information.

In step S240, the resource occupation position in all candidate positions in the transmission window of the synchronization signal block is determined according to the valid configuration information, the candidate positions being positions for transmitting the synchronization signal block.

The description of step S240 may refer to the same or corresponding steps, which is repeated herein.

In an embodiment of the present disclosure, the valid configuration information is determined according to the quasi co-location parameter. When the quasi co-location parameter Q is less than or equal to the number K of the candidate positions in the group of candidate positions indicated in the position configuration information, the first Q bits or the last Q bits in the position configuration information are used as the valid configuration information, so that the resource occupation position is determined according to the valid configuration information, the result of which is more accurate.

Figure 4:
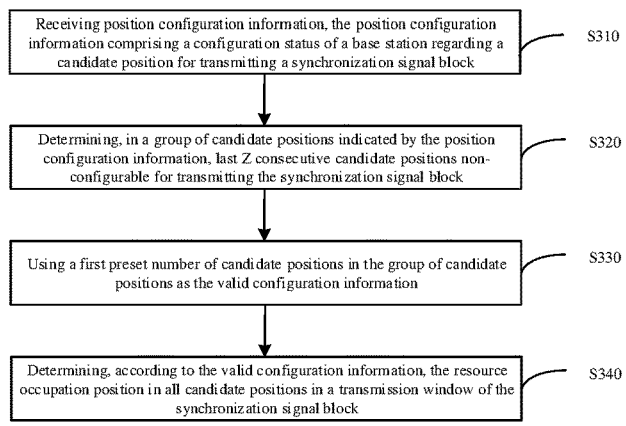
FIG. 4 shows a flowchart of a method for determining a resource occupation position according to yet another embodiment of the present disclosure.

The present disclosure also provides an embodiment, in which when finally there are one or more candidate positions where the synchronization signal block will not be transmitted in the group of candidate positions indicated by the position configuration information, the valid configuration information may be obtained by removing some of the last few candidate positions where the synchronization signal block will not be transmitted in the position configuration information. Specifically, referring to FIG. 4, steps S310 to S340 may be included in an embodiment.

In step S310, position configuration information is received.

In an embodiment of the present disclosure, the user equipment may receive the position configuration information from a base station, and the position configuration information indicates a group of candidate positions with a number being K, and indicates an arrangement relationship between a candidate position configurable for transmitting the synchronization signal block and a candidate position non-configurable for transmitting the synchronization signal block in the group of candidate positions.

For example, if the position configuration information is a bitmap, the total number of 0 and 1 in the bitmap is used as the number K of the candidate positions in the group of candidate positions, and the position relationship between 0 and 1 is used as the arrangement relationship.

In step S320, last Z consecutive candidate positions non-configurable for transmitting the synchronization signal block is determined in the group of candidate positions indicated by the position configuration information, Z being a non-negative integer.

In step S330, a first preset number of candidate positions in the group of candidate positions is used as the valid configuration information, the preset number being greater than or equal to K-Z.

If the last one or more consecutive candidate positions in the position configuration information are the candidate positions non-configurable for transmitting the synchronization signal block, the last Z consecutive candidate positions non-configurable for transmitting the synchronization signal block may be determined.

For example, in the position configuration information represented by the bitmap, if the last one or more bits are 0, the last Z 0s may be determined.

The preset number is determined according to the value of (K-Z), and the first preset number of candidate positions in the group of candidate positions in the position configuration information are used as the valid configuration information. When the position configuration information is represented by the bitmap, the first preset number of bits in the bitmap are used as the valid configuration information.

In an embodiment of the present disclosure, the value of Z may be determined by selecting, according to a maximum number of last consecutive candidate positions non-configurable for transmitting the synchronization signal block in the group of candidate positions, an optional maximum numerical value as the value of Z from a plurality of numerical values satisfying a preset condition. That is, the selected Z is less than the maximum number and is an optional maximum value.

For example, the plurality of numerical values satisfying the preset condition are 7, 6, 4, and 0, and in the position configuration information represented by the bitmap, if the last 5 bits in the bitmap are 0, the value of Z is 4, and if the last 6 bits are 0, then the value of Z is 6.

Optionally, the preset condition may that a number of candidate positions in the valid configuration information is in multiples of the quasi co-location parameter Q or that the quasi co-location parameter Q is in multiples of the number of candidate positions in the valid configuration information.

For example, if K is 8 and Q is 4, the optional values of Z that satisfy the preset condition are 0 and 4. In the position configuration information represented by the bitmap, if the last 3 bits in the bitmap are 0, the value of Z is 0; and if the last 5 bits in the bitmap are 0, the value of Z is 4.

Optionally, if Q is an even number greater than zero, and the plurality of numerical values satisfying the preset condition are values obtained by K minus integer powers of 2, among non-zero integers less than or equal to K.

For example, if K is 8, the numerical values 7, 6, 4, and 0 satisfying the preset condition may be obtained by 8 minus non-negative integer powers of 2.

Optionally, the plurality of numerical values satisfying the preset condition may be non-negative integers less than K.

For example, K is 8, and the optional value of Z that satisfies the preset condition is one of 7, 6, 5, 4, 3, 2, 1, and 0. In the position configuration information represented by the bitmap, if the last 5 bits in the bitmap are 0, the value of Z is 5; and if the last 6 bits in the bitmap are 0, the value of Z is 6.

In an embodiment of the present disclosure, the preset number is greater than or equal to K-Z, so that the final determined valid configuration information includes all candidate positions where the synchronization signal blocks may be transmitted in the position configuration information.

In addition, the larger value between the quasi co-location parameter Q and (K-Z) may be used as the preset number.

In an embodiment, the preset number may be determined by obtaining the quasi co-location parameter Q and using (K-Z) as the preset number if Q is less than or equal to (K-Z).

For example, if the position configuration information is 10100000 and the quasi co-location parameter is Q=2, the value of K-Z is 4 and the first 4 bits of the position configuration information are valid, that is, the valid configuration information at this time is 1010.

In an embodiment, the preset number may be determined by obtaining the quasi co-location parameter Q and using Q as the preset number if Q is greater than (K-Z).

For example, if the position configuration information is 10100000 and the quasi co-location parameter is Q=8, the value of K-Z is 4 and the first 8 bits of the position configuration information are valid, that is, the valid configuration information at this time is 10100000.

In an embodiment, the preset number may be determined by obtaining the quasi co-location parameter Q; comparing the magnitude relationship between Q and (K-Z); if Q is less than or equal to (K-Z), using (K-Z) as the preset number; and if Q is greater than (K-Z), using Q as the preset number.

In step S340, the resource occupation position in all candidate positions in a transmission window of the synchronization signal block is determined according to the valid configuration information, the candidate positions being positions for transmitting the synchronization signal block.

The description of this step may refer to the same or similar steps in the embodiments of the present disclosure, and details thereof are not described herein again.

In an embodiment of the present disclosure, when finally there are one or more candidate positions where the synchronization signal block will not be transmitted in the group of candidate positions indicated by the position configuration information, the valid configuration information may be obtained by removing some of the last few candidate positions where the synchronization signal block will not be transmitted in the position configuration information, so that the result of determining the resource occupation position is more accurate.

In addition, in an embodiment of the present disclosure, the user equipment may also directly use the position configuration information as the valid configuration information. Optionally, the user equipment may determine whether to directly use the position configuration information as the valid configuration information according to information transmitted by the base station. If the base station indicates that the position configuration information may directly be used as the valid configuration information, the position configuration information is used as the valid configuration information.

In an embodiment of the present disclosure, after the valid configuration information is determined, the resource occupation position in the transmission window is determined according to the valid configuration information. The manner of determining the resource occupation position according to the valid configuration information is described below by way of example.

The valid configuration information may include an arrangement relationship between a candidate position configurable for transmitting the synchronization signal block and a candidate position non-configurable for transmitting the synchronization signal block in a group of candidate positions for transmitting the synchronization signal block.

For example, in the valid configuration information represented by the bitmap, the position relationship between 0 and 1 represents the arrangement relationship between the candidate position configurable for transmitting the synchronization signal block and the candidate position non-configurable for transmitting the synchronization signal block. Then, in an embodiment, the arrangement relationship may be cyclically extended to all candidate positions in the transmission window. Among all the extended candidate positions, one or more candidate positions where the synchronization signal block may be transmitted is determined as the resource occupation position.

Specifically, M represents the number of all candidate positions in the transmission window, and M is a positive integer, then the cyclic extension is performed by cyclically extending, in the M candidate positions, the arrangement relationship of the group of candidate positions in the valid configuration information, thereby corresponding each of the M candidate positions to the candidate position configurable for transmitting the synchronization signal block or the candidate position non-configurable for transmitting the synchronization signal block, so that one or more candidate positions configurable for transmission among the extended M candidate positions may be determined as the resource occupation position.

For example, the valid configuration information is represented by a bitmap, 1 corresponds to the candidate position where the synchronization signal block may be transmitted, 0 corresponds to the candidate position where the synchronization signal block will not be transmitted, and the valid length of the bitmap is L bits. When there are M candidate positions in the transmission window, the L bits of valid configuration information are extended to the M candidate positions. In other words, the L bits are extended to the M bits, and the candidate positions corresponding to 1 after the extension are determined as the resource occupation positions.

Figure 5:
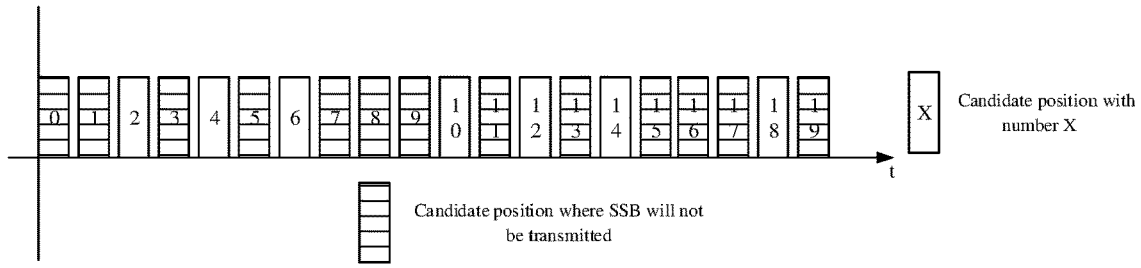
FIG. 5 to FIG. 12 show schematic diagrams of arrangements of candidate positions according to embodiments of the present disclosure.

As shown in FIG. 5, if the valid configuration information is 11010101 and there are 20 candidate positions in the transmission window of the synchronization signal block, the valid configuration information is cyclically extended to the 20 candidate positions to be 11010101 11010101 1101, in which 1 corresponds to the candidate position where the synchronization signal block may be transmitted, and 0 corresponds to the candidate position where the synchronization signal block will not be transmitted. Then, among the expanded 20 candidate positions, the candidate positions corresponding to 1 may be determined as the resource occupation positions, and the candidate positions corresponding to 0 are the non-resource occupation positions where no SSB may be transmitted and which may be used to transmit other information.

In an embodiment of the present disclosure, the arrangement relationship of the candidate positions in the valid configuration information is cyclically extended to all the candidate positions in the transmission window, so that the resource occupation positions of all the candidate positions in the transmission window may be determined according to the arrangement relationship.

In addition, when two reference signals (such as synchronization signal blocks) have a quasi co-location (QCL) relationship, it may be considered that large-scale parameters (such as Doppler delay, average delay, spatial reception parameters and the like) of the two reference signals may be inferred from each other, or may be considered similar. Correspondingly, the candidate positions with the quasi co-location relationship may transmit the same synchronization signal block. Therefore, in an embodiment of the present disclosure, the resource occupation position may is determined as a corresponding candidate position configurable for transmission among all the candidate positions in a transmission window of synchronization signal according to the arrangement relationship of a group of candidate positions. Specifically, in an embodiment, the resource occupation position may be determined according to the quasi co-location relationship.

In an embodiment, among all the candidate positions in the transmission window of synchronization signal, the candidate position having the quasi co-located relationship with the candidate position configurable for transmission may be determined as the resource occupation position according to the arrangement relationship.

Among all the candidate positions in one transmission window, there may be candidate positions with the quasi co-location relationship. Therefore, the candidate positions having the quasi co-location relationship therein may be determined.

The quasi co-location relationship may be determined according to a quasi co-location parameter, and the quasi co-location parameter may be a positive integer, which is represented by Q in an embodiment of the present disclosure. The user equipment may obtain the quasi co-location parameter from the base station.

In addition, all candidate positions in the transmission window may have corresponding numbers, and the user equipment may obtain the numbers from the base station or in a way predefined by the protocol.

If the values of the numbers of two candidate positions mod Q are the same, it may be determined that the two candidate positions have the quasi co-location relationship.

Figure 6:
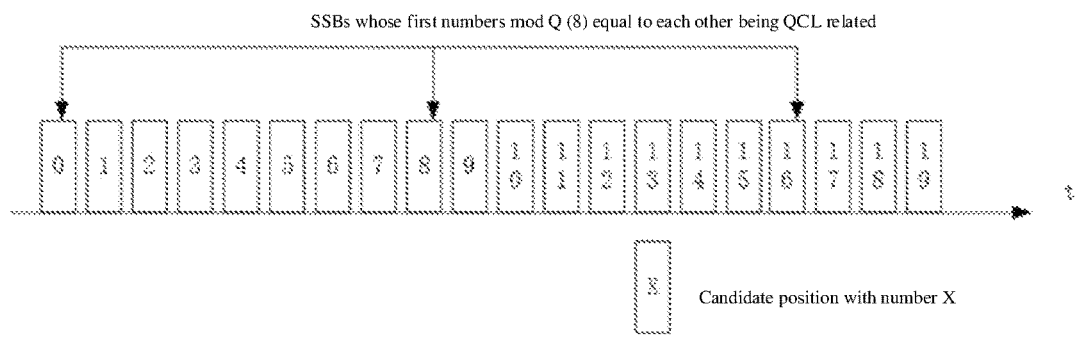

For example, the numbers of two candidate positions are M1 and M2, respectively. If M1 mod Q is equal to M2 mod Q, it is considered that the two candidate positions have the quasi co-location relationship. Alternatively, for example, as shown in FIG. 6, the value of Q is 8, and the numbers corresponding to the SSBs whose candidate positions are 0, 8, and 16 mod Q are all 0, then it may be determined that the candidate positions being 0, 8, and 16 have the quasi co-location relationship.

In an embodiment of the present disclosure, the candidate position having the quasi co-location relationship with the candidate position configurable for transmission may be that if the value of the number of the candidate position mod the quasi co-location parameter corresponds to the candidate position configurable for transmission in a group of candidate positions, it is determined that such candidate position has the quasi co-location relationship with the candidate position configurable for transmission.

Specifically, determining, among all the candidate positions in the transmission window of synchronization signal, the candidate position having the quasi co-location relationship with the candidate position configurable for transmission may refer to: obtaining the numbers of all the candidate positions in the transmission window; obtaining a plurality of modulo values by all the numbers mod the quasi co-location parameter; determining, among the plurality of modulo values, the modulo value corresponding to the arrangement position of the candidate position configurable for transmission in the arrangement relationship; and determining the candidate position corresponding to the determined modulo value as the candidate position having the quasi co-location relationship with the candidate position configurable for transmission. The candidate position configurable for transmission is the candidate position configurable for transmitting the synchronization signal block, that is, the candidate position where the synchronization signal block may be transmitted.

The modulus value corresponding to the arrangement position may be understood as that all M candidate positions in the transmission window includes 1st to Mth candidate positions, the modulus value obtained by the number of the first candidate position corresponds to the first candidate position in the arrangement relationship; the modulus value obtained by the number of the second candidate position corresponds to the second candidate position in the arrangement relationship, and so on, until the modulus value obtained by the number of the Lth candidate position corresponds to the Lth candidate position in the arrangement relationship. The arrangement relationship includes a group of L candidate positions.

Figure 7:
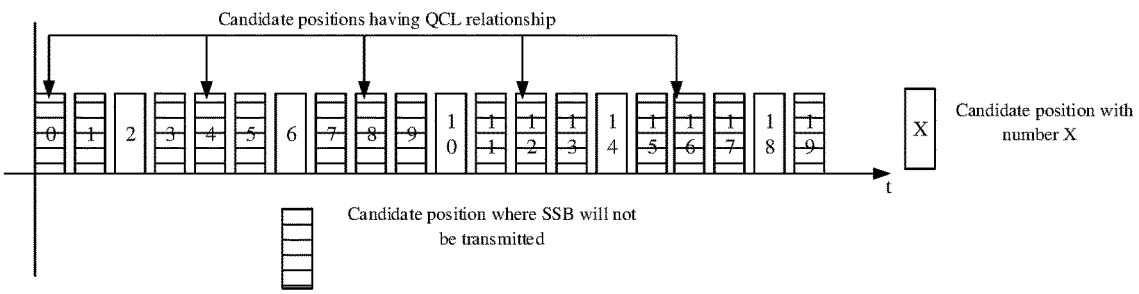

For example, as shown in FIG. 7, the valid configuration information is 1101, and the quasi co-location parameter is 4. Since the candidate position whose number mod 4 equals to 0 corresponds to the first 1 in the valid configuration information, the candidate position whose number mod 4 equals 1 corresponds to the second 1 in the valid configuration information, the candidate position whose number mod 4 equals to 3 corresponds to the fourth 1 in the valid configuration information, then the user equipment may determine that the candidate positions whose number mod 4 equals to 0 (such as the numbers 0, 4, 8, 12, 16 in FIG. 7), whose number mod 4 equals to 0 (such as the numbers 1, 5, 9, 13, 17 in FIG. 7) and whose numbers mod 4 equals to 3 (such as the numbers 3, 7, 11, 15, 19 in FIG. 7) are the resource occupation positions.

Optionally, in the transmission window, for the Xth candidate position, X is used as the ranking position of the candidate position in the time domain in the transmission window. The number corresponding to the Xth candidate position may be the last three digits of X.

For example, X is 9 (decimal), which is 1001, then the number of the corresponding candidate position is 001, which is 1 in decimal.

In addition, optionally, the number corresponding to the Xth candidate position may also be X.

For example, if X is 9, then the corresponding number is 9. Optionally, as shown in FIG. 7, the candidate position in the transmission window may start from 0th, and X may start from 0 to (M−1).

In an embodiment of the present disclosure, it mainly describes that the ranking position X of the candidate position is used as the number. Of course, if the number of the candidate position is in other forms, such as the last three digits of the ranking position X, the ranking position is the candidate position of X, and when mod Q, the last three digits are used to mod Q.

For example, for the ninth candidate position in FIG. 7 (that is, the candidate position corresponding to the number 9 in FIG. 7), if the last three digits of 9 are used as the number, since the binary of 9 is 0001, the last three digits of 001 are to mod Q.

In an embodiment of the present disclosure, the candidate position having the quasi co-location relationship with the candidate position configurable for transmission may be determined as the resource occupation location according to the quasi co-location parameter, which improves the speed of determining the resource occupation position.

Abase station has a high possibility of transmitting a synchronization signal block in the case of preempting a channel. Therefore, in an embodiment of the present disclosure, when it is determined that the base station has preempted the channel, the resource occupation position may be determined from the candidate positions in the transmission window, so that the determined resource occupation position is more accurate. Specifically, when indication information transmitted by the base station is received in the transmission window, a reference position is determined according to indication information. The indication information indicates that the base station has preempted the channel.

The indication information is information that may indicate that the base station has preempted the channel, for example, it may be COT indication, DCI message (carried on PDCCH or GC-PDCCH), or other reference information (such as SSB, CSI-RS, TRS, DMRS). Optionally, in an embodiment of the present disclosure, any information transmitted from the base station may be used as the indication information.

After the indication information is received, a reference position may be determined according to the indication information, and the reference position is a time domain position, which is used to determine whether to determine the resource occupation position for the candidate position after the reference position.

In an implementation manner, in an embodiment of the present disclosure, the time point at which the indication information is received may be directly used as the reference position.

In another embodiment, preset conditions may be provided for the position where the synchronization signal block is transmitted, for example, the synchronization signal block is transmitted at an even-numbered bit, the synchronization signal block is transmitted at a position of a multiple of 4, and the synchronization signal block is transmitted at a position of a multiple of 8. Therefore, in an embodiment of the present disclosure, the closest candidate position satisfying the preset condition after the time point when the indication information is received may be obtained as the reference position.

All candidate positions in the transmission window may be grouped. In the transmission window, from the first candidate position, every adjacent L candidate positions are put into a group, the remaining less than L candidate positions are put into a group, and a boundary between two groups is defined as a group boundary. L is the number of a group of candidate positions indicated in the valid configuration information. Optionally, in an embodiment of the present disclosure, the candidate position that satisfies the preset condition may be the first candidate position after the group boundary.

In addition, optionally, in an embodiment of the present disclosure, the candidate position satisfying the preset condition may also be a candidate position with an even number, or a candidate position with a number of a multiple of 4, or a candidate position with a number of a multiple of 8, or the closest candidate position after the indication information, which may be set as required.

The candidate position with the even number, or the candidate position with the number of a multiple of 4, or the candidate position with the number of a multiple of 8 may be calculated according to a formula, which may be X mod G=0, indicating that in the transmission window, the Xth candidate position represents a candidate position with the number of X as described above. The value of G may be set according to a preset condition, for example, if the candidate position satisfying the preset condition is the candidate position with the even number, the value of G is 2; if the candidate position satisfying the preset condition is the candidate position with the number of a multiple of 4, the value of G is 4; if the candidate position satisfying the preset condition is the candidate position with the number of a multiple of 8, the value of G is 8; and if the candidate position satisfying the preset condition is the closest candidate position after the indication information, the value of G is 1. G may be determined in one of the following manners: a broadcast message, including MIB, SIB1 (RMSI), and SIB; RRC dedicated signaling; and protocol pre-agreed.

In an embodiment of the present disclosure, when determining the resource occupation position in all candidate positions in the transmission window of the synchronization signal block according to the valid configuration information, the resource occupation position may be determined from the candidate positions after the reference position according to the valid configuration information. That is, after the reference position is determined, the resource occupation position is determined from the candidate positions after the reference position.

In an embodiment of the present disclosure, if the reference position itself is a candidate position, the candidate position after the reference position may include the reference position itself, and the candidate position between the reference position and the group boundary may include the reference position itself. Of course, if the reference position itself is a candidate position, the candidate position after the reference position may not include the reference position, and the candidate position between the reference position and the group boundary may not include the reference position itself, which can be set as required.

In the embodiment of the present disclosure, determining the resource occupation position is mainly described by taking the time point when the indication information is received being used as the reference position as an example.

In an embodiment of the present disclosure, determining the resource occupation position from the candidate positions after the reference position may be that, all the candidate positions after the reference position are taken as the resource occupation positions; or all the candidate positions where the synchronization signal block may be transmitted after the reference position are taken as the resource occupation positions; or, the resource occupation position is determined from a specified number of candidate positions after the reference position, and the specified number may be determined according to the reference position and the number of a group of candidate positions.

Hereinafter, different embodiments are used to describe the determination of the resource occupation position according to a specified number of candidate positions after the reference position.

In a first implementation, the valid configuration information may include a group of candidate positions with the number L by which the base station transmits the synchronization signal block, where L is a positive integer. In all the candidate positions for the synchronization signal block in the transmission window, every L adjacent candidate positions may be put into a group, and the remaining less than L candidate positions are put into a group, and a boundary between two groups is used as a group boundary.

In an embodiment, when the resource occupation position is determined from the candidate positions after the reference position according to the valid configuration information, the closest group boundary after the reference position may be determined, and from the candidate positions between the reference position and the group boundary and the closest L candidate positions after the group boundary, one or more candidate positions are determined as the resource occupation position.

Figure 8:
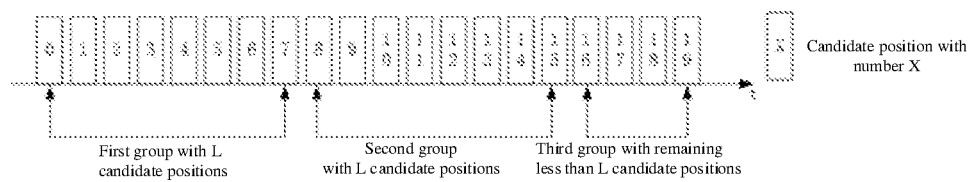

In an embodiment, the grouping is described by taking a bitmap as an example of the valid configuration information. The valid length of the bitmap is L. If the value of L is 8, the grouping of every L candidate positions in the transmission window may be as shown in FIG. 8. Since the last 4 candidate positions (that is, the candidate positions with the numbers 16 to 19 in FIG. 8) is less than 8, the 4 candidate positions are grouped into a group. In the grouping shown in FIG. 8, the group boundaries are between 7 and 8 and between 16 and 16. Optionally, as required, in an embodiment of the present disclosure, the positions before the first candidate position and after the last candidate position (for example, as shown in FIG. 8, before the candidate position with the number 0 and after the candidate position with the number 19) in the transmission window may be used as the group boundaries. The first number information in FIG. 8 is the number of the candidate position.

Figure 9:
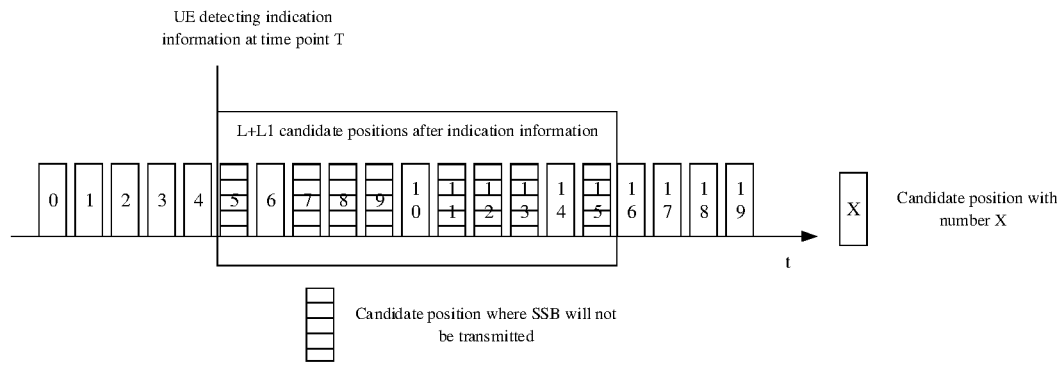

After the reference position is determined, it may determine the closest group boundary after the reference position, that is, the group boundary after the time point at which the reference position is located and closest to the time point at which the reference position is located. As shown in FIG. 9, the time point corresponding to the indication information is the reference position. Further with reference to FIG. 8, the group boundary closest to the reference position is between 7 and 8.

In an embodiment, one or more candidate positions may be determined as the resource occupation position from candidate positions between the reference position and the closest group boundary and L candidate positions after the closest group boundary.

Optionally, in an embodiment, the candidate positions between the reference position and the closest group boundary and the L candidate positions after the closest group boundary may be used as the resource occupation positions.

For example, as shown in FIG. 9, the candidate positions with the numbers 5 to 7 are the candidate positions between the reference position and the closest group boundary, and the candidate positions with the numbers 8 to 15 are the L candidate positions after the closest group boundary, then the candidate positions with the numbers 5 to 7 and 8 to 15 are determined as the resource occupation positions.

Optionally, in an embodiment, the candidate positions, where the synchronization signal block may be transmitted, among the candidate positions between the reference position and the closest group boundary and the L candidate positions after the closest group boundary may be used as the resource occupation positions.

The valid configuration information may include the arrangement relationship between the candidate position where the synchronization signal block may be transmitted and the candidate position where the synchronization signal block will not be transmitted in a group of candidate positions. Since the candidate position having the quasi co-location relationship with the candidate position where the synchronization signal block may be transmitted may transmit the synchronization signal block, in an embodiment of the present disclosure, the specific way of determining the resource occupation position may be that according to the arrangement relationship of a group of candidate positions, the candidate position, having the quasi co-location relationship with the candidate position where the synchronization signal block may be transmitted, among the candidate positions between the reference position and the group boundary and the L candidate positions after the group boundary is determined as the resource occupation position.

For the determination of the candidate position having the quasi co-location relationship with the candidate position configurable for transmission may be transmitted, details may refer to the corresponding parts in the foregoing embodiments, which will not be described herein again.

For example, as shown in FIG. 9, the time point when the indication information is received is used as the reference position, and the bitmap is used as the valid configuration information. The bitmap is 11011101, that is, the valid length of the valid configuration information is 8, indicating that there are 8 candidate positions in a group of candidate positions. The quasi co-location parameter for determining the quasi co-location relationship between the candidate positions is Q=8, then the user equipment determines, among the (3+8) candidate positions (i.e., 5 to 15 in FIG. 9) after the indication information, the candidate position whose number mod Q is equal to 0 (corresponding to the first 1 in the bitmap), 1 (corresponding to the second 1 in the bitmap), 3 (corresponding to the fourth 1 in the bitmap), 4 (corresponding to the fifth 1 in the bitmap), 5 (corresponding to the sixth 1 in the bitmap), or 7 (corresponding to the eighth 1) is the resource occupation position, which is the resource that cannot transmit PDCCH or PDSCH or other RS (such as CSI-RS, DMRS, TRS, PTRS).

In another embodiment, the valid configuration information may include the arrangement relationship between the candidate position where the synchronization signal block may be transmitted and the candidate position where the synchronization signal block will not be transmitted in a group of candidate positions. When from the candidate positions between the reference position and the group boundary and the closest L candidate positions after the group boundary, one or more candidate positions is determined as the resource occupation position according to the valid configuration information, the candidate position, among L1 candidate positions between the reference position and the group boundary, corresponding to the candidate position configurable for transmission in the last L1 candidate positions in the arrangement relationship is used as the resource occupation position, and the candidate position, among the closest L candidate positions after the group boundary, corresponding to the candidate position configurable for transmission in the arrangement relationship is used as the resource occupation position. It may be understood that the candidate position configurable for transmission is a candidate position where the base station may transmit the synchronization signal block, that is, a candidate position where the base station has a possibility of transmitting the synchronization signal block. L1 represents the number of candidate positions between the reference position and the group boundary.

Figure 10:
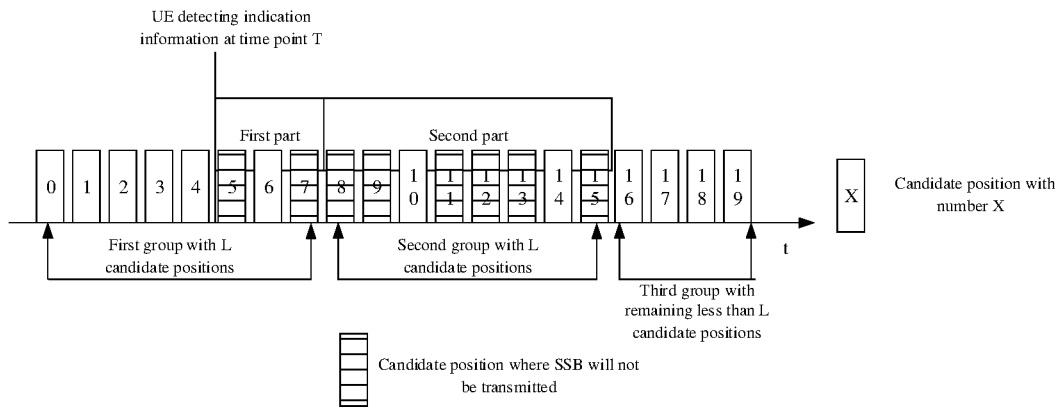

For example, as shown in FIG. 10, the valid configuration information is 11011101, the length thereof is 8, and the L1 (3) candidate positions from the indication information to the closest group boundary thereafter are the candidate positions with the numbers 5 to 7 in a first part of FIG. 10. The resource occupation position is determined according to the last L1 (3) bits of the valid configuration information, that is, as the candidate position corresponding to the candidate position configurable for transmission among the last L1 candidate positions in the valid configuration information. As shown in FIG. 10, among the candidate positions with the numbers 5-7, the number 5 corresponds to the 1 in the sixth position in the valid configuration information, the number 6 corresponds to the 0 in the seventh position in the valid configuration information, and the number 7 corresponds to the 1 in the eighth position in the valid configuration information. It may be determined that among the three candidate positions between the indication information and the group boundary, the numbers 5 and 7 are the resource occupation positions respectively.

In addition, in a second part of FIG. 10, the candidate positions corresponding to the numbers 8 to 15 are L (8) candidate positions after the closest group boundary. Among the 8 candidate positions, the candidate positions sequentially corresponding to is in the valid configuration information 11011101 are the candidate positions with the numbers 8, 9, 11, 12, 13 and 15, respectively, then the candidate positions corresponding to the numbers 8, 9, 11, 12, 13 and 15 are the resource occupation positions.

An embodiment of the present disclosure also provides a second implementation. In an embodiment, the valid configuration information may include a group of candidate positions with the number L for the base station to transmit the synchronization signal block, and L is a positive integer. Determining the resource occupation position from the candidate positions after the reference position according to the valid configuration information may be: determining the resource occupation position from the closest L candidate positions after the reference position.

Figure 11:
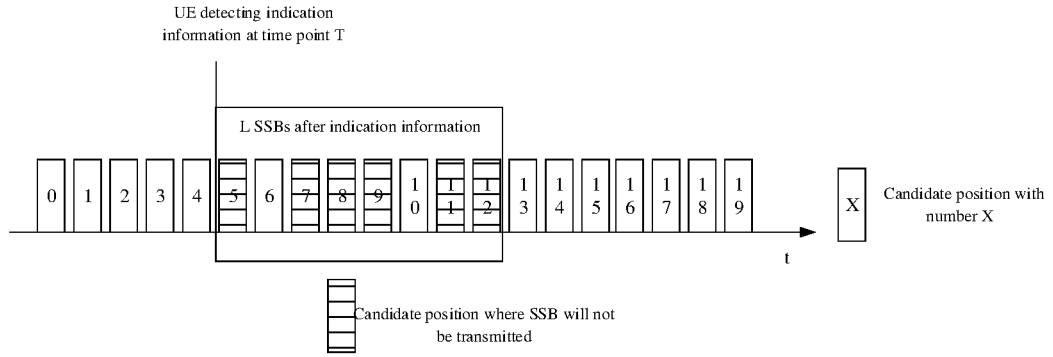

For example, as shown in FIG. 11, the valid configuration information is a bitmap with a valid length of 8, and the indication information is used as a reference position, which is between the candidate positions with the numbers 4 and 5 as shown in FIG. 11. The resource occupation position may be determined from the 8 candidate positions after the indication information, that is, from the candidate positions with the numbers 5 to 12.

Optionally, in an embodiment, the L closest candidate positions after the reference position may all be determined as the resource occupation positions.

Optionally, in an embodiment, the candidate position where the synchronization signal block may be transmitted among the closest L candidate positions after the reference position may be used as the resource occupation position.

The valid configuration information may include the arrangement relationship between the candidate position where the synchronization signal block may be transmitted and the candidate position where the synchronization signal block will not be transmitted in the group of candidate positions. Since the candidate position having a quasi co-location relationship with the synchronization signal block where the synchronization signal block may be transmitted has a possibility of transmitting the synchronization signal block, in an embodiment, determining the resource occupation position from the closest L candidate positions after the reference position according to the valid configuration information may be: according to the arrangement relationship, determining, among the closest L candidate positions after the reference position, the candidate position having the quasi co-location relationship with the candidate position where the synchronization signal block may be transmitted in the arrangement relationship as the resource occupation position.

For the determination of the candidate position having the quasi co-location relationship with the candidate position configurable for transmission, details may refer to the corresponding parts in the foregoing embodiments, which will not be described herein again.

For example, as shown in FIG. 11, the time point when the indication information is received is used as the reference position, and the bitmap is used as the valid configuration information. The bitmap is 11011101, that is, the valid length of the valid configuration information is 8, indicating that there are 8 candidate positions in a group of candidate positions. The quasi co-location parameter for determining the quasi co-location relationship between the candidate positions is Q=8, then the user equipment determines, among the 8 candidate positions after the indication information, the resource occupation position. As shown in FIG. 11, among the candidate positions, the candidate position whose number mod Q is equal to 0 (corresponding to the first 1 in the bitmap), 1 (corresponding to the second 1 in the bitmap), 3 (corresponding to the fourth 1 in the bitmap), 4 (corresponding to the fifth 1 in the bitmap), 5 (corresponding to the sixth 1 in the bitmap), or 7 (corresponding to the eighth 1) corresponds to 1 in the bitmap, and thus it is determined that among the 8 candidate positions after the indication information, the candidate positions with the numbers 5, 7, 8, 9, 11 and 12 are the resource occupation positions.

In another embodiment, every adjacent L candidate positions of all the candidate positions in the transmission window are grouped into a group, and the remaining plurality of candidate positions that do not satisfy the number L are grouped into a group. The valid configuration information may include the arrangement relationship between the candidate position where the synchronization signal block may be transmitted and the candidate position where the synchronization signal block will not be transmitted in a group of candidate positions.

In an embodiment, determining the resource occupation position from the closest L candidate positions after the reference position according to the valid configuration information may include: determining the closest group boundary after the reference position; determining, among L2 candidate positions between the reference position and the closest group boundary, the candidate positions corresponding to the last L2 candidate positions configurable for transmission in the arrangement relationship as the resource occupation positions; and determining, among L3 candidate positions after the closest group boundary, the candidate positions corresponding to the candidate positions configurable for transmission in the first L3 candidate positions in the arrangement relationship as the resource occupation positions, L2 and L3 are non-negative integers, and the sum of L2 and L3 is L. It may be understood that L2 represents the number of candidate positions between the reference position and the group boundary. The candidate position configurable for transmission is a candidate position where the base station may transmit the synchronization signal block, that is, a candidate position where the base station has a possibility of transmitting the synchronization signal block.

Figure 12:
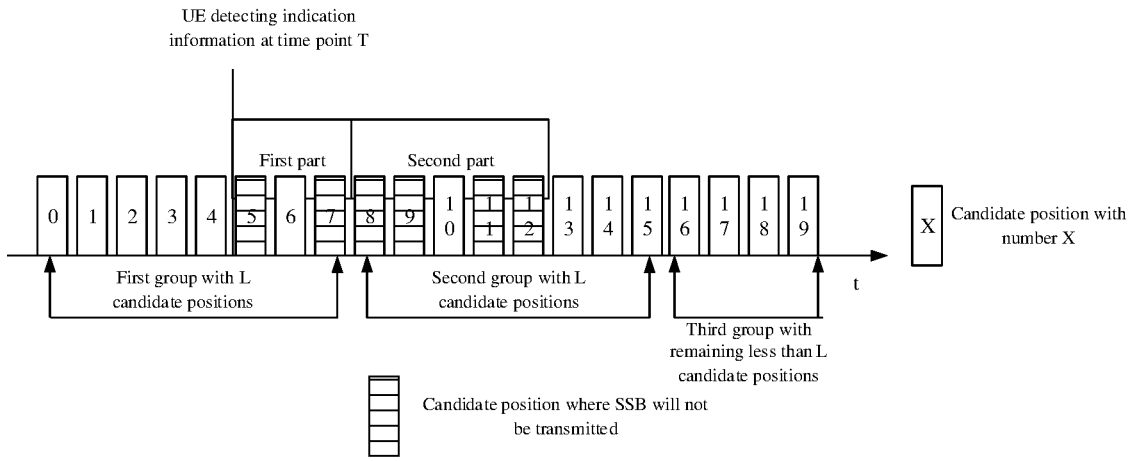

For example, as shown in FIG. 12, the time point when the indication information is received is used as the reference position, and the bitmap is used as the valid configuration information. The bitmap is 11011101, i.e., the valid length of the valid configuration information is 8, which indicates that there are 8 candidate positions in a group of candidate positions. The L2 (3) candidate positions between the indication information and the closest group boundary are the candidate positions with the numbers 5 to 7 in a first part of FIG. 12. The resource occupation position is determined according to the last L2 (3) bits of the valid configuration information, that is, as the candidate position corresponding to the candidate position configurable for transmission among the last L2 candidate positions in the valid configuration information. As shown in FIG. 12, among the candidate positions with the numbers 5-7, the number 5 corresponds to the 1 in the sixth position in the valid configuration information, the number 6 corresponds to the 0 in the seventh position in the valid configuration information, and the number 7 corresponds to the 1 in the eighth position in the valid configuration information. It may be determined that among the three candidate positions between the indication information and the group boundary, the numbers 5 and 7 are the resource occupation positions respectively.

In addition, in FIG. 12, the candidate positions corresponding to the numbers 8 to 12 are L3 (5) candidate positions after the closest group boundary. Among the candidate positions with the numbers 8 to 12, the number 8 corresponds to the 1 in the first position in the valid configuration information, the number 9 corresponds to the 1 in the second position in the valid configuration information, the number 10 corresponds to the 0 in the third position in the valid configuration information, the number 11 corresponds to the 1 in the fourth position in the valid configuration information, and the number 12 corresponds to the 1 in the fifth position in the valid configuration information. It may be determined that among the five candidate positions after the closest group boundary, the numbers 8, 9, 11 and 12 are the resource occupation positions respectively.

In the above-mentioned first implementation, if the reference position is at the group boundary, the resource occupation position may be determined from the closest L candidate positions after the reference position.

In an embodiment of the present disclosure, one of the above two implementations may be implemented alternatively. In other words, when the reference position is at the group boundary, the resource occupation position is determined with the above-mentioned second implementation, that is, the resource occupation position is determined from the closest L candidate positions after the reference position; and if the reference position is not at the group boundary, the resource occupation position may be determined with the above-mentioned first implementation, that is, one or more candidate positions may be determined from the candidate positions between the reference position and the group boundary and the closest L candidate positions after the group boundary as the resource occupation position.

Therefore, optionally, in an embodiment of the present disclosure, it may also be determined whether the reference position is at the group boundary. If yes, the above second implementation is executed, that is, the resource occupation position is determined from the closest L candidate positions after the reference position; if not, the above second implementation is executed, that is, one or more candidate positions is determined from the candidate positions between the reference position and the group boundary and the closest L candidate positions after the group boundary as the resource occupation position.

In an embodiment of the present disclosure, after receiving the indication information, the reference position may be determined according to the indication information, so as to determine the resource occupation position from the candidate positions after the reference position, the determined resource occupation position is more accurate, and more unoccupied candidate positions may be determined, thereby determining more available candidate positions.

In addition, in an embodiment of the present disclosure, the above-mentioned embodiments may be executed selectively, or executed according to some received information.

In an embodiment, when the indication information transmitted by the base station is not received in the transmission window, it may determine, according to the arrangement relationship of a group of candidate positions, the candidate position corresponding to the candidate position configurable for transmission among all the candidate positions in the transmission window of the synchronization signal as the resource occupation position.

In another embodiment, the manner in which the resource occupation position is determined may be determined according to an indication of the base station. Specifically, configuration information transmitted by the base station may be obtained, and the manner of determining the resource occupation may be obtained according to the configuration information.

In the configuration information, the manner of determining the resource occupation position may be indicated by first information, and specifically, the determining manner may be selected from different determining manners according to the indication of the first information and the presence or absence of the first information.

In addition, in an embodiment, the first information may be transmitted in any form, for example, the first information may be transmitted in one or more of the following ways: a broadcast message, including MIB, SIB1 (RMSI), SIB; RRC dedicated signaling; DCI message (carried on PDCCH or GC-PDCCH); MAC CE message and the like.

In an embodiment, the manner of determining the resource occupation position may be determined according to the configuration information received from the base station, so that the determining manner is more explicit.

In an embodiment of the present disclosure, whether to determine the resource occupation position in the candidate position may also be determined according to an indication of the base station.

Specifically, in an embodiment, configuration information may be obtained, and whether to determine the resource occupation position is determined according to the configuration information. If it is determined that the resource occupation position is to be determined, valid configuration information is determined, and according to the valid configuration information, the resource occupation position among all the candidate positions in the transmission window of the synchronization signal block is determined, that is, the method for determining the resource occupation position in the foregoing embodiment may be performed.

In an embodiment of the present disclosure, the configuration information involved in different embodiments may be the same or different. If the configuration information is the same, the information used in the configuration information may be different in different embodiments.

In an embodiment of the present disclosure, second information in the configuration information may be used to determine whether to determine the resource occupation position. If the second information indicates that the resource occupation position is to be determined, it is determined to determine the resource occupation position; if the second information indicates that the resource occupation position is not to be determined, it may be determined not to determine the resource occupation position.

In an embodiment, after it is determined whether the resource occupation position is determined according to the second information, any transmission window after the second information may be based on the determining result until the second information is received again.

In another embodiment, each transmission window may be indicated by the second information. According to the indication result, it is determined whether to determine the resource occupation position in the current transmission window or the latest transmission window after receiving the second information.

Optionally, in an embodiment of the present disclosure, the second information is not received, which may also be used as an indication.

For example, if the second information is not received, it is determined not to determine the resource occupation position; or if the second information is not received, it is determined to determine the resource occupation position.

In an embodiment of the present disclosure, the second information may be transmitted from the base station in one or more of the following manners: a broadcast message, including MIB, SIB1 (RMSI), and SIB; RRC dedicated signaling; DCI message (carried on PDCCH or GC-PDCCH); MAC CE message.

Figure 13:
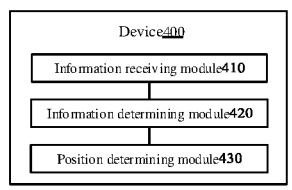
FIG. 13 shows a functional block diagram of a device for determining a resource occupation position according to an embodiment of the present disclosure.

An embodiment of the present disclosure further provides a device for determining a resource occupation position. As shown in FIG. 13, the device includes: an information receiving module 410, configured to receive position configuration information, the position configuration information including a configuration status of a base station regarding a candidate position for transmitting a synchronization signal block; an information determining module 420, configured to determine valid configuration information in the position configuration information; and a position determining module 430, configured to determine, according to the valid configuration information, the resource occupation position in all candidate positions in a transmission window of the synchronization signal block, the candidate positions being positions for transmitting the synchronization signal block.

Optionally, the device further includes: a parameter obtaining module, configured to obtain a quasi co-location parameter, the quasi co-location parameter being configured to determine a quasi co-location relationship between the candidate positions in the transmission window. The information determining module 420 is configured to determine the valid configuration information in the position configuration information according to the quasi co-location parameter.

Optionally, the position configuration information indicates a group of candidate positions with a number being K, and the quasi co-location parameter is Q, where K and Q are positive integers; and the information determining module 420 is configured to use first Q candidate positions in the group of candidate positions as the valid configuration information in response to Q being less than or equal to K.

Optionally, the position configuration information indicates a group of candidate positions with a number being K, and the quasi co-location parameter is Q, where K and Q are positive integers; and the information determining module 420 is configured to use last Q candidate positions in the group of candidate positions as the valid configuration information in response to Q being less than or equal to K.

Optionally, the position configuration information indicates a group of candidate positions with a number being K, and indicates an arrangement relationship between a candidate position configurable for transmitting the synchronization signal block and a candidate position non-configurable for transmitting the synchronization signal block in the group of candidate positions, where K is a positive integer. The information determining module 420 may be configured to: determine, in the group of candidate positions indicated by the position configuration information, last Z consecutive candidate positions non-configurable for transmitting the synchronization signal block, where Z is a non-negative integer; and use a first preset number of candidate positions in the group of candidate positions as the valid configuration information, wherein the preset number is greater than or equal to K-Z.

Optionally, the method device further includes: a parameter obtaining module, configured to obtain a quasi co-location parameter Q, wherein the quasi co-location parameter is configured to determine a quasi co-location relationship between the candidate positions in the transmission window, where Q is a positive integer; and the information determining module 420 is configured to use (K-Z) as the preset number in response to Q being less than or equal to (K-Z).

Optionally, the method device further includes: a parameter obtaining module, configured to obtain a quasi co-location parameter Q, wherein the quasi co-location parameter is configured to determine a quasi co-location relationship between the candidate positions in the transmission window, where Q is a positive integer; and the information determining module 420 is configured to use Q as the preset number in response to Q being greater than (K-Z).

Optionally, the information determining module 420 may be configured to select, according to a maximum number of last consecutive candidate positions non-configurable for transmitting the synchronization signal block in the group of candidate positions, an optional maximum numerical value as a value of Z from a plurality of numerical values satisfying a preset condition.

Optionally, the preset condition is that a number of candidate positions in the valid configuration information is in multiples of Q or that Q is in multiples of the number of candidate positions in the valid configuration information, Q is a positive integer representing the quasi co-location parameter, and the quasi co-location parameter is configured to determine a quasi co-location relationship between the candidate positions in the transmission window.

Optionally, the plurality of numerical values satisfying the preset condition are non-negative integers less than K.

Optionally, Q is an even number greater than zero, and the plurality of numerical values satisfying the preset condition are values obtained by K minus non-negative integer powers of 2, among non-zero integers less than or equal to K.

Optionally, the position configuration information is represented by a bitmap, each bit in the bitmap corresponds to a candidate position, one of 0 or 1 in the bitmap represents the candidate position configurable for transmitting the synchronization signal block, and the other one of 0 or 1 in the bitmap represents the candidate position non-configurable for transmitting the synchronization signal block.

A person skilled in the art may clearly understand that, for the convenience and simplicity of description, the above-mentioned method embodiments may refer to each other; and the specific working process of the above-described device and module may refer to the corresponding process in the above-mentioned method embodiments, which will not be repeated here.

In several embodiments provided in the present disclosure, the coupling between the modules may be electrical, mechanical or in other forms.

In addition, respective functional modules in respective embodiments of the present disclosure may be integrated into one processing module, or respective modules may exist physically and separately, or two or more modules may be integrated into one module. The above-mentioned integrated module may be implemented in the form of hardware, and may also be implemented in the form of software function module. Respective modules may be configured in different user equipments, or may be configured in the same user equipment, which is not limited in embodiments of the present disclosure.

Figure 14:
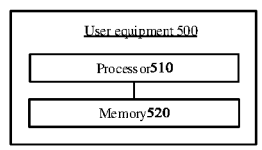
FIG. 14 shows a structural block diagram of a user equipment according to an embodiment of the present disclosure.

FIG. 14 shows a structural block diagram of a user equipment 500 provided by an embodiment of the present disclosure. The user equipment 500 may be a smart device that can perform 5G communication, such as a smart phone, a wearable device, an electronic reader, a tablet computer, a computer, and the like. The user equipment may include one or more processors 510 (only one is shown in the figure), a memory 520 and one or more programs. The memory may include a system memory and a touch screen memory. The system memory is used to store system data of the user equipment and various files called by the system. The one or more programs may be stored in the system memory and configured to be executed by one or more processors 510. The one or more programs are configured to perform the methods described in the above embodiments. The touch screen memory is used to store the touch screen operating system and the use files related to the touch screen, for example, may store the touch screen firmware.

The processor 510 may include one or more processing cores. The processor 510 uses various interfaces and lines to connect various parts of the entire user equipment 500, and performs various functions of the user equipment 500 and processes data by running or executing instructions, programs, code sets or instruction sets stored in the memory 520, and calling the data stored in the memory 520. Optionally, the processor 510 may be embodied in at least one hardware form of a digital signal processing (DSP), a field-programmable gate array (FPGA), and a programmable logic array (PLA). The processor 510 may integrate one or a combination of a central processing unit (CPU), a graphics processing unit (GPU) and a modem. The CPU mainly processes the operating system, user interface and application programs, etc.; the GPU is used for rendering and drawing of display content; the modem is used for performing wireless communication. It may be understood that, the above-mentioned modem may not be integrated into the processor 510, and is implemented by a communication chip alone.

The memory 520 may include a random access memory (RAM) or a read-only memory. The memory 520 may be used to store instructions, programs, codes, sets of codes, or sets of instructions. The memory 520 may include a program-storing area and a data-storing area. The program-storing area may store instructions for implementing an operating system, instructions for implementing at least one function, instructions for implementing the above method embodiments, and the like. The data-storing area may store the data created by the user equipment when being used.

Figure 15:
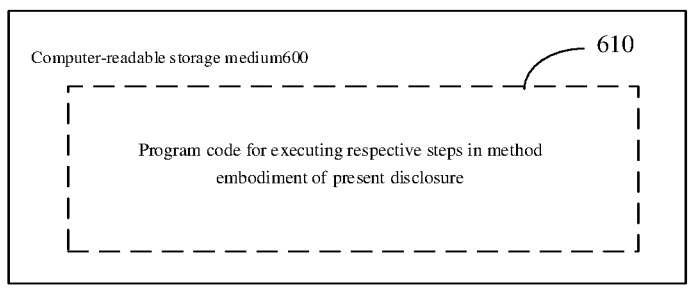
FIG. 15 is a storage unit for storing or carrying a program code for implementing the method for determining the resource occupation position of the embodiment of the present disclosure according to an embodiment of the present disclosure.

FIG. 15 shows a structural block diagram of a computer-readable storage medium according to an embodiment of the present disclosure. The computer-readable storage medium 600 stores program codes, and the program codes may be invoked by a processor to execute the methods described in the above method embodiments.

The computer-readable storage medium 600 may be an electronic memory such as flash memory, EEPROM (electrically erasable programmable read only memory), EPROM, hard disk, or ROM. Optionally, the computer-readable storage medium 600 includes a non-transitory computer-readable storage medium. The computer-readable storage medium 600 has a storage space for the program code 610 for performing any of the method steps in the above-described methods. These program codes may be read from or written to one or more computer program products. The program code 610 may be compressed, for example, in a suitable form.

Finally, it should be noted that the above embodiments are only used to illustrate the technical solutions of the present disclosure but not intended to limit the same; although the present disclosure has been described in detail with reference to the foregoing embodiments, a person skilled in the art may understand that modifications may be made to the technical solutions described in the foregoing embodiments or equivalent replacements may be made to some technical features thereof, and these modifications or replacements do not make the essence of the corresponding technical solutions to deviate from the spirit and scope of the technical solutions in the embodiments of the present disclosure.

What is claimed is:

1. A method for determining a resource occupation position, comprising:
   receiving position configuration information from a base station, wherein the position configuration information comprises a configuration status of a candidate position for transmitting a synchronization signal block;
   determining valid configuration information in the position configuration information; and
   determining, according to the valid configuration information, the resource occupation position in all candidate positions in a transmission window of the synchronization signal block, wherein the candidate positions are positions for transmitting the synchronization signal block,
   wherein the method further comprises:
   obtaining a quasi co-location parameter, wherein the quasi co-location parameter is configured to determine a quasi co-location relationship between the candidate positions in the transmission window,
   wherein determining the valid configuration information in the position configuration information comprises:
   determining the valid configuration information in the position configuration information according to the quasi co-location parameter.

2. The method according to claim 1, wherein the position configuration information indicates a group of candidate positions with a number being K, and the quasi co-location parameter is Q, where K and Q are positive integers, and
   determining the valid configuration information in the position configuration information according to the quasi co-location parameter comprises:
   using first Q candidate positions in the group of candidate positions as the valid configuration information in response to Q being less than or equal to K.

3. The method according to claim 2, wherein the position configuration information is represented by a bitmap, each bit in the bitmap corresponds to a candidate position, one of 0 or 1 in the bitmap represents the candidate position configurable for transmitting the synchronization signal block, and the other one of 0 or 1 in the bitmap represents the candidate position non-configurable for transmitting the synchronization signal block.

4. The method according to claim 3, wherein a length of the bitmap represents the number of the candidate positions in the group of candidate positions.

5. The method according to claim 1, wherein the position configuration information is used as the valid configuration information.

6. A user equipment, comprising:
   a processor;
   a transceiver; and
   a memory having one or more programs stored thereon that, when being executed by the processor, cause the processor to perform:
   controlling the transceiver to receive position configuration information from a base station, wherein the position configuration information comprises a configuration status of a candidate position for transmitting a synchronization signal block;
   determining valid configuration information in the position configuration information; and
   determining, according to the valid configuration information, resource occupation position in all candidate positions in a transmission window of the synchronization signal block, wherein the candidate positions are positions for transmitting the synchronization signal block,
   wherein the one or more programs, when being executed by the processor, cause the processor to further perform:
   controlling the transceiver to obtain a quasi co-location parameter, wherein the quasi co-location parameter is configured to determine a quasi co-location relationship between the candidate positions in the transmission window,
   wherein determining the valid configuration information in the position configuration information comprises:

determining the valid configuration information in the position configuration information according to the quasi co-location parameter.

7. The user equipment according to claim 6, wherein the position configuration information indicates a group of candidate positions with a number being K, and the quasi co-location parameter is Q, where K and Q are positive integers, and determining the valid configuration information in the position configuration information according to the quasi co-location parameter comprises:

using first Q candidate positions in the group of candidate positions as the valid configuration information in response to Q being less than or equal to K.

8. The user equipment according to claim 7, wherein the position configuration information is represented by a bitmap, each bit in the bitmap corresponds to a candidate position, one of 0 or 1 in the bitmap represents the candidate position configurable for transmitting the synchronization signal block, and the other one of 0 or 1 in the bitmap represents the candidate position non-configurable for transmitting the synchronization signal block.

9. The user equipment according to claim 8, wherein a length of the bitmap represents the number of the candidate positions in the group of candidate positions.

10. The user equipment according to claim 6, wherein the position configuration information is used as the valid configuration information.

11. A base station, comprising:
a processor;
a transceiver; and
a memory having one or more programs stored thereon that, when being executed by the processor, cause the processor to perform:
controlling the transceiver to transmit position configuration information to a user equipment,
wherein the position configuration information comprises a configuration status of a candidate position for transmitting a synchronization signal block,
wherein the position configuration information comprises valid configuration information, and resource occupation position in all candidate positions in a transmission window of the synchronization signal block is determined according to the valid configuration information, and wherein the candidate positions are positions for transmitting the synchronization signal block, wherein the one or more programs, when being executed by the processor, cause the processor to further perform:

controlling the transceiver to transmit a quasi co-location parameter to the user equipment, wherein the quasi co-location parameter is configured to determine a quasi co-location relationship between the candidate positions in the transmission window, and wherein the valid configuration information in the position configuration information is determined according to the quasi co-location parameter.

12. The base station according to claim 11, the position configuration information indicates a group of candidate positions with a number being K, and the quasi co-location parameter is Q, where K and Q are positive integers, and wherein first Q candidate positions in the group of candidate positions are used as the valid configuration information in response to Q being less than or equal to K.

13. The base station according to claim 12, wherein the position configuration information is represented by a bitmap, each bit in the bitmap corresponds to a candidate position, one of 0 or 1 in the bitmap represents the candidate position configurable for transmitting the synchronization signal block, and the other one of 0 or 1 in the bitmap represents the candidate position non-configurable for transmitting the synchronization signal block.

14. The base station according to claim 13, wherein a length of the bitmap represents the number of the candidate positions in the group of candidate positions.

15. The base station according to claim 11, wherein the position configuration information is used as the valid configuration information.

* * * * *